United States Patent [19]

Athy

[11] Patent Number: 4,684,231
[45] Date of Patent: Aug. 4, 1987

[54] CAMERA FILTER ADAPTOR SYSTEM

[76] Inventor: Dale A. Athy, 1718 E. Beverly La., Phoenix, Ariz. 85022

[21] Appl. No.: 816,310

[22] Filed: Jan. 6, 1986

[51] Int. Cl.$^4$ .......................... G03B 11/00; G02B 7/00
[52] U.S. Cl. ....................................... 354/295; 350/318
[58] Field of Search ................. 354/295, 296; 350/318

[56] References Cited

U.S. PATENT DOCUMENTS

| 2,707,418 | 5/1955 | Magnuson | 350/252 |
| 3,758,200 | 9/1973 | Saito | 350/318 |
| 4,302,078 | 11/1981 | Stravitz | 350/318 |
| 4,381,885 | 5/1983 | Coquin | 350/318 |
| 4,383,735 | 5/1983 | Stravitz | 354/295 |
| 4,390,242 | 6/1983 | Tatsumi | 350/318 |
| 4,416,528 | 11/1983 | Breslau et al. | 354/296 |
| 4,443,061 | 4/1984 | Coquin | 350/318 |

Primary Examiner—A. A. Mathews
Attorney, Agent, or Firm—Nissle & Leeds

[57] ABSTRACT

An improved camera lens filter holder attachment system. The system permits light filtering attachments to be readily installed over and removed from the lens of a camera with a single short snap-on motion of the hand and wrist of a photographer. A releasable cammed attachment mechanism is utilized to maintain a light filtering attachment in position over a camera lens.

3 Claims, 12 Drawing Figures

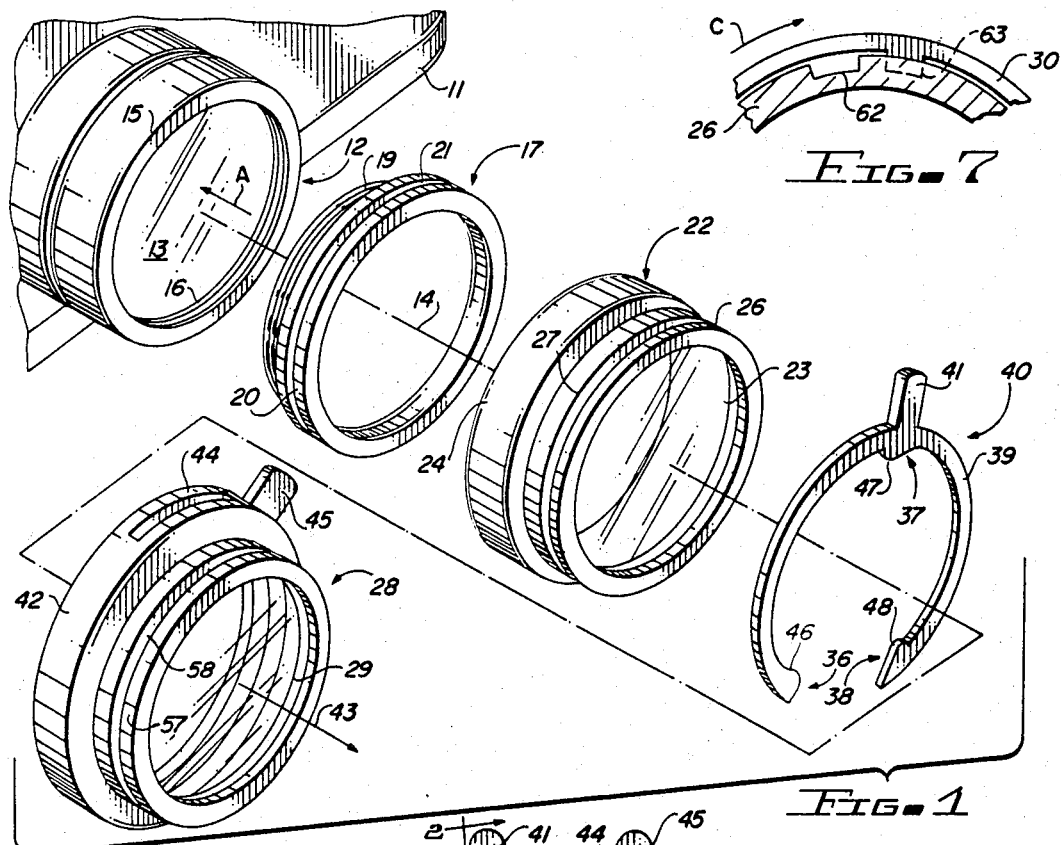
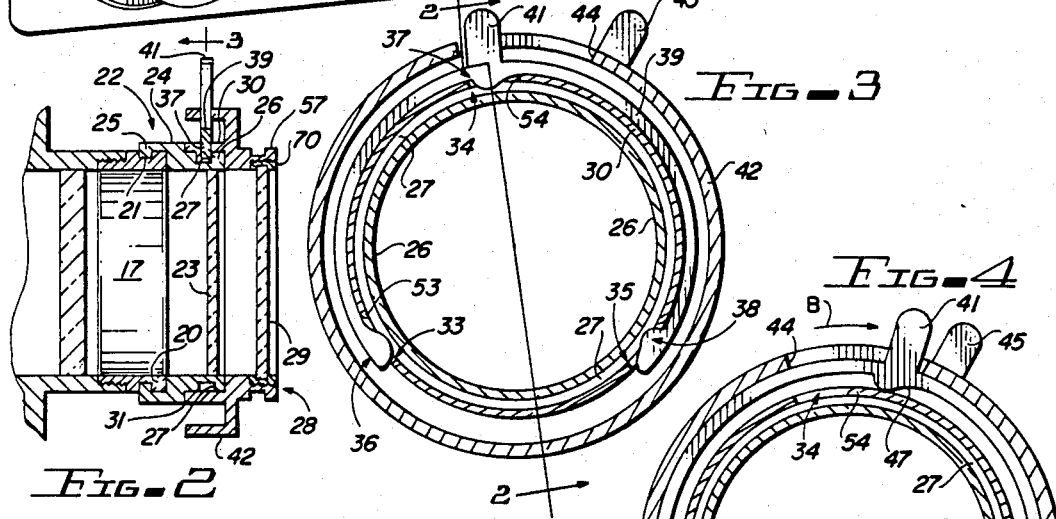
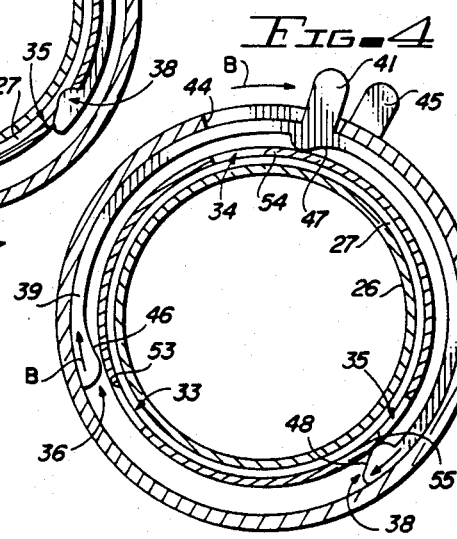
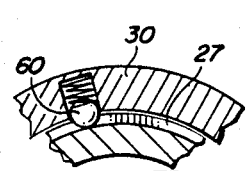
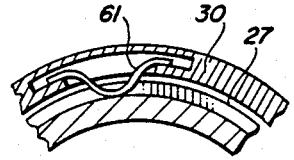

U.S. Patent Aug. 4, 1987 Sheet 2 of 2 4,684,231
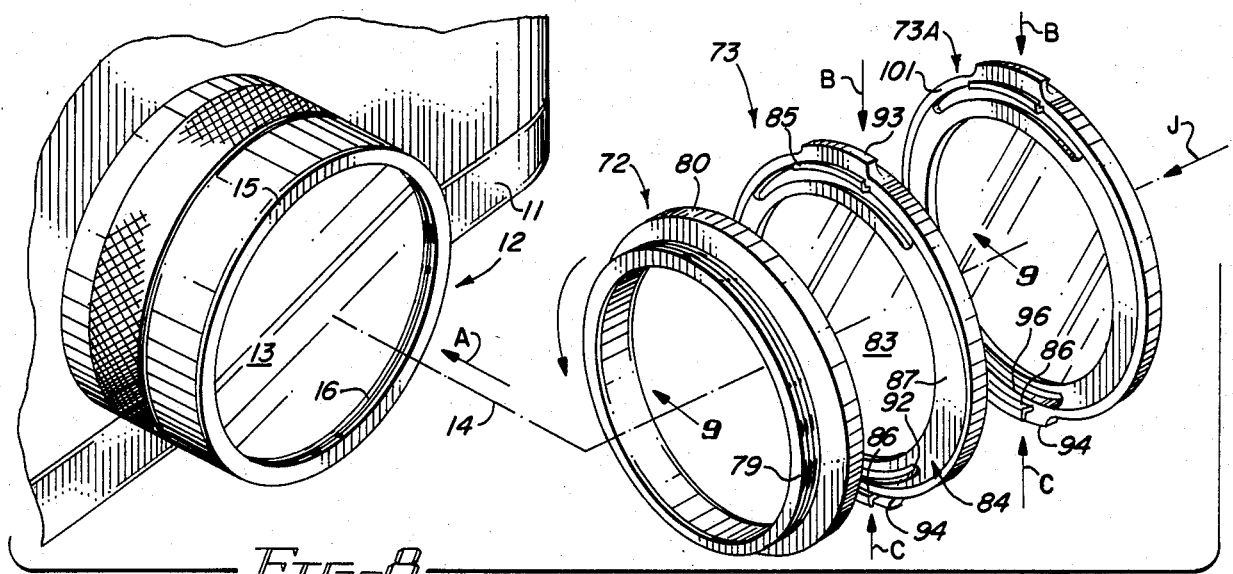
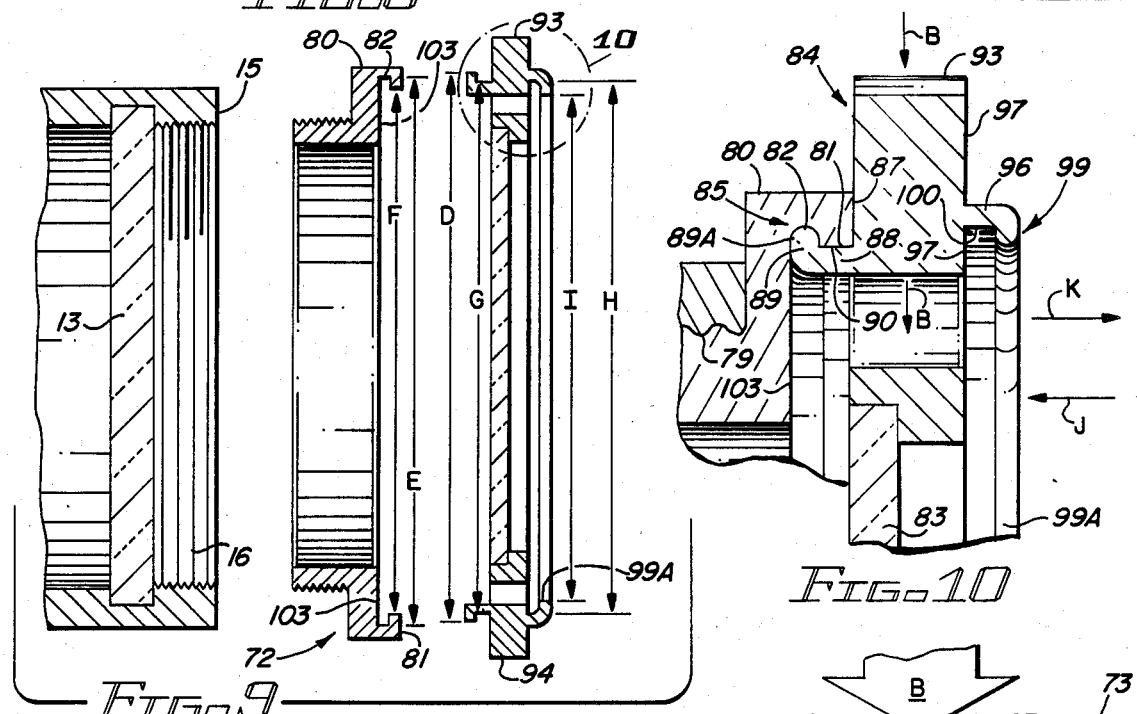
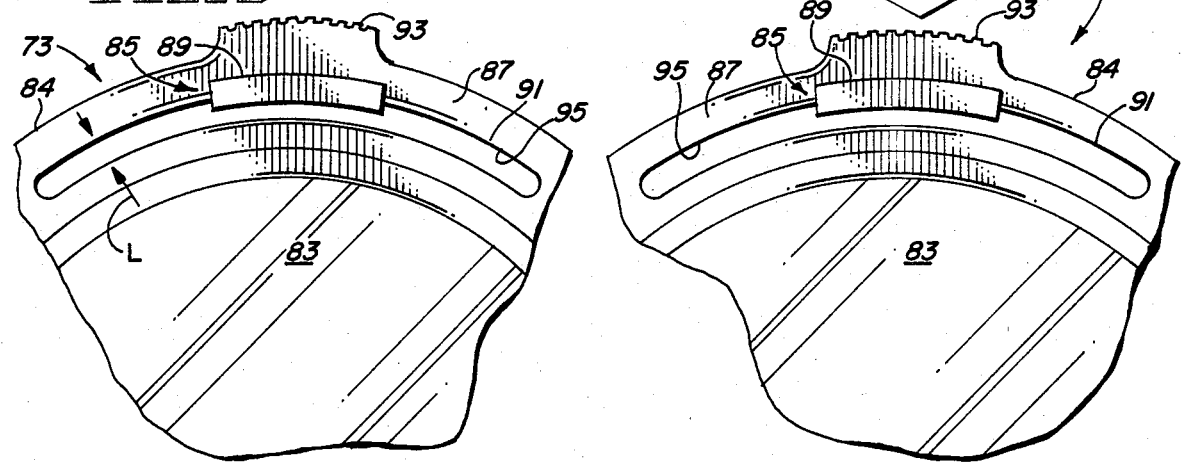

CAMERA FILTER ADAPTOR SYSTEM

This invention relates to light filtering attachments for the lens of a camera.

More particularly, the invention relates to a camera lens light filtering attachment which can be readily installed over and removed from the lens of a camera with a single short snap-on motion of the hand and wrist of the photographer.

In a further respect, the invention pertains to a camera lens filter attachment system which utilizes a cammed attachment mechanism to maintain a light filter in position over a camera lens.

In yet another respect, the invention pertains to a camera lens filter attachment system which can be readily utilized in conjunction with conventional circular externally threaded 35 mm camera filter holders.

Camera lens filter attachments are well known in the art. See, for example, U.S. Pat. Nos. 2,707,418 to Magnuson, 3,758,200 to Saito, 4,302,078 to Stravitz, and 4,416,528 to Breslau et al. Conventional circular glass or plastic filters for a 35 mm camera are mounted in a holder having a rear hollow circular externally threaded portion and a forward hollow internally threaded portion. The lens housing of conventional 35 mm cameras is internally threaded near the circular front edge of the lens. Conventional, circular filter holders are sized such that the externally threaded rear portion of the holders can be turned into the internally threaded portion of the lens housing of a 35 mm camera. The forward internally threaded portion of each filter holder will accept the externally threaded rear portion of another conventional filter holder, permitting a plurality of filter holders to be threaded into one another to form a "stack" of filter holders.

While conventional threaded filter holders have gained widespread acceptance, use of the filters has disadvantages. In particular, it is fairly easy to cross thread filters into the lens housing of a camera. Further, rapid interchange of conventional filters is difficult because of the time required to unscrew stacked filters from one another and from the lens housing of a camera.

Another conventional camera lens light filtering system is described in U.S. Pat. No. 4,302,078 to Stravitz and includes an adaptor which is threaded into the lens housing of a 35 mm camera. A filter holder is attached to the adaptor and includes a plurality of spaced apart, parallel, vertical slots formed in a pair of vertically oriented, spaced apart opposing walls in the filter holder. Square pieces of glass or other filter material are inserted in the holder by sliding each piece of material into a pair of opposing slots, each slot being on one of the two vertical opposing walls of the filter holder. Attempting to quickly interchange filters utilizing the Stravitz filter holder is, as is the case with conventional circular threaded filters, impractical.

Accordingly, it would be highly desirable to provide an improved camera filter holder attachment system which would permit a filter holder to be quickly attached to and removed from the lens housing of a camera and which would permit a group of interconnected filter holders mounted on a camera lens to be quickly separated from one another and the camera lens.

Therefore, it is a principal object of the instant invention to provide an improved filter holder attachment system for utilization in conjunction with the lens housing of a camera.

A further object of the invention is to provide an improved camera filter holder attachment which can be quickly attached to and removed from the lens housing of a camera with a simple short snap-on motion of the hand and wrist of a photographer.

Another object of the instant invention is to provide an improved camera lens filter holder attachment which can be rapidly separated from and reconnected to like filter holder attachments and which can be utilized in conjunction with conventional circular threaded filter holders.

These and other, further and more specific objects and advantages of the invention will be apparent to those skilled in the art from the following detailed description thereof, taken in conjunction with the drawings, in which:

FIG. 1 is a perspective assembly view of a camera lens filter holder attachment system constructed in accordance with the principles of the invention;

FIG. 2 is a side section view of the filter holder attachment system of FIG. 1 after it has been assembled on the lens of the camera thereof;

FIG. 3 is a front section view of the filter holder system of FIG. 2 taken along section line 3—3 thereof;

FIG. 4 is a front view of the filter holder apparatus of FIG. 3 illustrating the mode of operation thereof;

FIG. 5 is a section view of a filter holder constructed in accordance with an alternate embodiment of the invention;

FIG. 6 is a partial section view of a filter holder system constructed in accordance with still another embodiment of the invention;

FIG. 7 is a partial section view of a filter holder system constructed in accordance with yet another embodiment of the invention;

FIG. 8 is a perspective assembly view illustrating an alternate embodiment of the camera lens filter holder attachment system of the invention;

FIG. 9 is a side section view of a portion of the camera lens filter holder attachment system of FIG. 8 taken along section line 9—9 thereof;

FIG. 10 is an enlarged view of the portion of the camera lens filter holder attachment system of FIG. 9 encircled by dashed line 10 thereof;

FIG. 11 is an enlarged front view of one of the filter members of the camera lens filter holder attachment system of FIG. 8; and, FIG. 12 is an enlarged front view of one of the filter members of the camera lens filter holder attachment system of FIG. 8 illustrating the mode of operation thereof.

Briefly, in accordance with my invention, I provide an improved light filtering system for a camera, the camera including a cylindrical housing having a light focusing lens and having an internally threaded hollow cylindrical wall portion forward of the lens, light entering the lens in a direction of travel generally perpendicular to the face of the lens. The light filtering system includes a hollow adaptor member having a housing with an externally threaded rear portion sized to turn into and engage the internally threaded camera lens housing and having a forward portion with an outer circular peripheral lip; and, a filter member mounted on the adaptor housing. The filter member includes a hollow housing having a back portion with a cylindrical wall including a lip adapted to removably fit over and contact the outer peripheral lip of the adaptor, the filter member being fit over the adaptor lip by pressing the filter member lip onto and over the adaptor lip in a direction generally parallel to the direction of travel of light into the lens; and, a filter mounted in the housing. The filter member can also include an aperture formed through the cylindrical wall of the back portion of the filter member, at least a portion of the surface of the wall circumscribing and defining the periphery of the aperture having a curved surface; and, a latching member for detachably fixedly engaging the adaptor member to retain the filter member thereon. The latching member includes a resilient arcuate body at least partially circumscribing the cylindrical wall of the filter member; a foot member attached to and extending outwardly from the resilient arcuate body and having a cam-shaped edge, the foot member normally extending from the arcuate body through the aperture formed in the cylindrical wall of the filter member and extending behind the peripheral lip of the adaptor member; and, a lever member attached to and extending outwardly from the arcuate body. The filter member is removed from the adaptor member by radially displacing the lever to slidably displace the arcuate body over the cylindrical wall and force the cam-shaped outer edge of the foot against and over the curved surface of the aperture to upwardly displace the foot through the aperture and from behind the peripheral circular lip of the adaptor member; and, pulling the filter member away from the adaptor member in a direction generally opposed to the direction of travel of light entering the lens.

Turning now to the drawings, which depict the presently preferred embodiments of the invention for the purpose of illustrating the practice thereof and not by way of limitation of the scope of the invention and in which like reference characters represent corresponding elements throughout the several views, FIGS. 1 to 4 depict the presently preferred embodiment of the camera lens filter holder attachment system of the invention. Camera 11 is provided with cylindrical housing 12 carrying light focusing lens 13. Light enters lens 13 in a direction of travel generally parallel to dashed line 14 as indicated by arrow A. Lens housing 12 includes a hollow cylindrical wall portion 15 forward of the lens 13 and internally threaded 16. A hollow adaptor member includes housing 17 having externally threaded rear portion 19 sized to be turned into and engage internally threaded portion 16 of camera lens housing 12. The forward portion of adaptor housing 17 includes outer circular peripheral lip 20 and U-shaped groove 21. Filter member 22 includes transparent filter element 23 mounted in a cylindrical housing having a back portion with a resilient cylindrical wall 24 including a lip 25 adapted to removably fit over and contact the outer peripheral lip 20 of the adaptor housing 17. Lip 25 snaps over lip 20 in the same manner that the outer circular lip on a plastic top for a coffee can snaps over the circular lip of the can. The forward portion of filter member 22 includes an outer circular peripheral lip 26 and U-shaped groove 27 formed in member 22 rearwardly of lip 26. In the presently preferred embodiment of the invention shown in FIGS. 1-4, the shape, contour and dimension of lip 20 is equivalent to that of lip 26, and, of U-shaped groove 21 is equivalent to that of U-shaped groove 27.

Filter member 28 includes a hollow housing having transparent filter element 29 mounted therein. The hollow housing of filter member 28 includes a back portion with a cylindrical wall 30 (FIG. 2) having a lip 31 adapted to fit over and contact outer peripheral lip 26 of filter member 22. As would be appreciated by those of skill in the art, lip 31 would also fit over circular lip 20 of adaptor member 17. Latching member 40 includes arcuate body 39 having depending feet 36–38 outwardly extending therefrom. Lever 41 extends outwardly from resilient body 39. Elongate apertures 33, 34 and 35 are formed through cylindrical wall 30 of filter member 28 and are shaped and dimensioned to permit feet 36–38 to slidably extend therethrough. When adaptor 17 and filter members 22 and 28 are installed on a camera as illustrated in FIG. 2, each foot 36, 37, 38 extends from resilient body member 39 through its respective aperture 33, 34 and 35 into groove 27 behind peripheral lip 26 of filter member 22. When filter member 28 is installed over filter member 22 and latching member 40 is positioned as shown in FIGS. 2 and 3, feet 36–38 extend into groove 27 and prevent filter member 28 from being pulled off of filter member 22 in the direction of arrow 43 in FIG. 1.

In FIGS. 2 and 3, body 39 of latching member 40 is shown in its normal operative position with arcuate resilient body 39 partially positioned between cylindrical walls 30, 42 of filter member 28 and partially circumscribing wall 30. Lever 41 of latching member 40 extends through elongate aperture 44 formed in cylindrical wall 42. The elongate shape of aperture 44 is similar to the elongate shape of each of apertures 33–35 formed in wall 30 of filter member 28. Support member 45 is fixedly attached to and outwardly extends from wall 42 of filter member 28. Each foot 36–38 of latching member 40 is provided with a cam-shaped curved outer edge 46–48. Outer edges 46–48 can be semi-circular, elliptical or take on any other desired arcuate shape, contour and dimension. Each aperture 33–35 is defined by the respective portion of wall 30 circumscribing and defining the peripheral edge of the aperture. An end portion 53–55 of each aperture 33–35 has a curved surface which, as will be described, is operatively associated with the outer cammed cam-shaped surface of one of feet 36–38.

In FIGS. 2 and 3, filter member 28 is shown fixedly detachably mounted on filter member 22. Filter member 28 is, as depicted in FIG. 4, removed from filter member 22 by squeezing lever 41 and member 45 between the fingers, causing lever 41 to be displaced in the direction of arrows B. When lever 41 is radially displaced in the direction of arrows B in FIG. 4, cam-shaped surfaces 46, 47, 48 of feet 36, 37, 38 slidably contact and ride up and over curved surfaces 53, 54, 55 of apertures 33, 34, 35, causing feet 36–38 to be upwardly displaced through apertures 33–35 and from U-shaped groove 27 of filter member 22. After lever 41 is displaced along groove 44 to the position shown in FIG. 4, resilient body 39 has expanded and is generally spaced away from cylindrical wall 30 and feet 36–38 are positioned on top of and contacting cylindrical wall 30. Once resilient member 40 is rotated to the position of FIG. 4, filter member 28 can be simply pulled off of member 22 in the direction of arrow 43 in FIG. 1. Since the shape and dimension of peripheral lip 20 and groove 21 are identical to the shape and dimension of peripheral lip 26 and groove 27, filter member 22 can be detached from adaptor ring 17 and set aside and filter member 28 directly attached to adaptor ring 17. When filter member 28 is directly attached to adaptor ring 17 feet 36–38 of latching mechanism 40 extend into groove 21 behind peripheral circular edge 20.

Peripheral circular lip 57 and U-shaped groove 58 of filter member 22 are identical in shape, contour and dimension to outer peripheral lip 26 and U-shaped groove 27, respectively, of filter member 22. Consequently, a filter member identical to member 28 can be fixedly detachably secured to lip 57 and groove 58 of member 28 in the same manner that filter member 28 is secured to lip 26 and groove 27 of filter member 22 in FIG. 2.

The filter holder attachment apparatus of the invention can be utilized with latching mechanisms other than member 40. For example, in FIG. 5 wall 30 of filter member 28 is provided with a spring loaded ball bearing 60 which extends into groove 27 of filter member 22 when member 28 is attached to member 22 in the same manner generally illustrated in FIG. 2. Similarly, a spring clip 61 (FIG. 6) could be mounted in the wall 30 of member 28 and extend into groove 27 of filter member 22 when member 28 is positioned on member 22 in the manner shown in FIG. 2. Finally, in FIG. 7 a U-shaped slot 62 is formed in wall 26 of member 22 while wall 30 of filter member 28 is provided with a downwardly projecting tooth 63. To attach member 28 to member 22, the rear portion of member 28 is pressed against lip 26 of member 22 such that tooth 63 registers with and passes through slot 62 into groove 27. Filter member 28 is then rotated in the direction of arrow C to slide tooth 62 along slot 27 away from opening 62 to secure member 28 in position on filter member 22.

In FIG. 2, the cylindrical housing of filter member 22 is internally threaded 70 to receive conventional externally threaded circular filter holders of the type utilized with 35 mm cameras. If desired, filter element 29 can be permanently secured inside the cylindrical housing of member 28.

As would be appreciated by those of skill in the art, filter member 22 can be adapted to be detachably secured to adapter housing 17 by magnetic force. Peripheral lip 20 of housing 17 can be fabricated from iron and a magnet implanted in lip 25 of member 22. Lip 26 of member 22 can similarly be formed of iron and a magnet implanted in lip 31 of member 28 such that member 28 remains on member 22 in the position illustrated in FIG. 2 without requiring the utilization of latching member 40 in filter member 28.

An alternate embodiment of the camera lens filter holder attachment system of the invention is depicted in FIGS. 8-12 and includes adaptor member 72 and filter members 73 and 73A. In FIG. 8, camera 11 is provided with cylindrical housing 12 carrying light focusing lens 13. Light enters lens 13 in a direction of travel generally parallel to dashed line 14 as indicated by arrow A. Lens housing 12 includes a hollow planar circular wall portion 15 forward of the lens 13 and of threaded inner cylindrical wall 16. Circular hollow adaptor member 72 includes externally threaded rear portion 79 sized to be turned into and engage internally threaded wall 16 of camera lens housing 12. The forward portion of adaptor member 72 includes outer circular peripheral edge 80 having inwardly extending circular lip 81 bounding and partially defining U-shaped circular groove 82 of edge 80. Circular lip 81 and groove 82 continuously extend around adaptor member 72. Filter member 73 includes transparent filter element 83 mounted in a flat circular housing 84 having arcuate interlock units 85, 86 outwardly projecting from the rear surface 87 thereof. The curvature of interlock units 85, 86 is generally equivalent to the curvature of lip 81 and groove 82 of adaptor member 72. Units 85, 86 each include an arcuate throat 88 extending outwardly from rear surface 87 and having outwardly extending arcuate lip 89 depending therefrom. Lip 89, throat 88, and housing 84 cooperatively define U-shaped groove 90. Arcuate slots 91, 92 are formed through housing 84. Housing 84 is formed of a generally rigid but somewhat resilient plastic or other material. Serrated finger tabs 93, 94 extend outwardly from housing 84. When the thumb and forefinger of a photographer's hand are placed on tabs 93, 94, respectively, and are squeezed toward one another, tabs 93, 94 and arcuate interlock units 85, 86 are displaced toward one another, in the direction indicated by arrows B and C. When tabs 93, 94 are compressed between the thumb and forefinger, arcuate ribs 95, 96 resiliently give and are displaced in the manner illustrated in FIG. 12. In FIG. 11, tab 93, rib 95 and interlock unit 85 are shown in their normal operative positions. In FIG. 12, tab 93, rib 95 and unit 85 are shown inwardly displaced in the direction of arrow B after tabs 93, 94 are compressed between the thumb and forefinger of a hand. When tabs 93 and 94 are compressed between the thumb and forefinger, tab 94, rib 96 and unit 86 are inwardly displaced in the manner illustrated in FIG. 12 for tab 93, rib 95 and unit 85. When tabs 93, 94 are in their normal operative positions (FIGS. 9, 11) and are not compressed, the distance between lips 89 of units 85, 86 is indicated by arrows D in FIG. 9 and is generally equivalent to or slightly less than the diameter E of groove 82. Conversely, the diameter F of circular lip 81 is generally equivalent to or slightly less than the distance G between the bottoms of arcute U-shaped grooves 94 of interlock units 85, 86. Consequently, lips 89 of units 85, 86 interlock into groove 82 of adapter member 72, and portions of lip 81 interlock into groove 90 of filter member 73 in the manner shown in FIG. 10.

Circular neck 96 outwardly projects from rear wall 97 of housing 84. Circular lip 99 down inwardly depends from neck 96. Neck 96, rear surface 97 and lip 99 cooperatively define circular U-shaped groove 100. The diameter of groove 100, indicated by arrows H in FIG. 9, generally corresponds to the diameter E of circular groove 82 in adapter 72. The diameter circumscribed by the innermost circular edge 99A of lip 99, indicated by arrows I in FIG. 9, generally corresponds to the diameter F of the innermost circular edge of lip 81 of adapter 72. U-shaped groove 100 and circular lip 99 are sized to interlock with lip 89 and groove 90 of unit 85 of filter member 73A in the same manner that unit 85 and groove 90 interlock with lip 81 and groove 82 in FIG. 10.

In use, threaded portion 79 of adaptor member 72 is turned into threaded portion 16 of camera lens 12. Tabs 93 and 94 of filter member 73 are grasped between the thumb and forefinger of a photographer's hand and are compressed in the directions indicated by arrows B and C in FIGS. 8, 10 and 12. The compression of tabs 93 causes each interlock unit 85, 86 and associated rib 95, 96 to be inwardly deflected in the manner illustrated in FIG. 12 for tab 93 and unit 85. Tabs 93 and 94 are inwardly deflected until the distance D between the outermost portions of units 85, 86 is less than or equal to the diameter F of inner lip 81 of adaptor 72. This permits filter member 73 and lips 89 thereof to be manually displaced toward adaptor member 72 in the direction of arrow J in FIG. 10. Filter member 73 is displaced toward adaptor member 72 until the outermost circular surfaces 89A of lips 89 contact circular planar surface 103 of adaptor 72. Once surfaces 89A contact surface 103 of adaptor 72, the thumb and forefinger which are compressing tabs 93, 94 toward one another are released. After the compressive force acting on tabs 93 and 94 is released, the tabs resiliently return to their normal operative positions illustrated in FIGS. 8–11, and lips 81 and 89 interlock in the manner shown in FIG. 10. Filter member 73 is disengaged from adaptor member 72 by simply compressing tabs 93, 94 between the thumb and forefinger of a hand and pulling filter member 73 in the direction indicated by arrow K (FIG. 10) while adaptor member 72 remains stationary.

In FIG. 8 filter member 73A is identical to filter member 73. Filter member 73A can be clipped onto filter member 73 in the same manner member 73 is clipped onto adaptor member 72. For instance, after adaptor member 72 has been threaded into lens 12 and filter member 73 has been mounted in on adaptor 72 in the manner indicated, filter member 73A is clipped onto filter member 73 by compressing tabs 93, 94 of member 73A between the thumb and forefinger of one hand and manually displacing interlock units 85, 86 of filter 73A toward filter 73 in the direction of arrow J (FIG. 8) until units 85, 86 contact circular planar surface 97 of member 73. After units 85, 86 contact surface 97, the thumb and finger are removed from tabs 93, 94 of filter member 73A, permitting units 85, 86 to resilient outwardly return to their normal operative positions and interlock with groove 100 in the same manner that units 85, 86 of member 73 interlock with groove 82 of adaptor member 72.

If desired, filter member 73 can be utilized as a lens cap. Lens 83 can be opaque or member 73 can, while retaining interlock units 85 and 86, tabs 93 and 94, and apertures 91 and 92, be designed as a lens cap.

As would be appreciated by those of skill in the art, if filter member 73 is fabricated from a material which is sufficiently flexible, apertures 91 and 92 do not have to be formed through frame 84 in order to permit tabs 93 and 94 to be compressed an amount sufficient to permit lips 85 and 86 to be inserted through lip 81 and against surface 103 of adaptor member 72. However, when filter member 73 is fabricated from a generally rigid resilient material, apertures 91 and 92 may be necessary in order to permit tabs 93 and 94 to be compressed toward one another the distance necessary to insert units 85, 86 in groove 82 and lip 81 of adaptor member 72.

Filter 83 can be removably mounted in housing 84 of filter member 73.

Having described my invention in such terms as to enable those skilled in the art to which it pertains to understand and practice it, and having described the presently preferred embodiments thereof, I claim:

1. In combination with a camera, said camera including a cylindrical housing having a light focusing lens and having an internally threaded hollow cylindrical wall portion forward of the lens, light entering said lens in a direction of travel generally perpendicular to the face of said lens,
a light filtering system including,
  (a) a hollow adapter member having a housing with an externally threaded rear portion sized to turn into and engage said internally threaded lens housing and having a forward portion with a lip extending outwardly from said forward portion;
  (b) a first filter member detachably secured to said adapter housing and including
    (i) a hollow housing having
      a front surface,
      a rear surface,
      an outer peripheral edge circumscribing said housing,
      at least one slot formed through said housing and extending from said rear surface to said front surface and spaced away from said peripheral edge, the portion of said housing intermediate said slot and said peripheral edge being resiliently inwardly deflectable when a compressive force is applied to said portion of said peripheral edge generally centered over said slot,
      a first lip attached to and extending ouwardly from said back surface of said portion of said housing intermediate said slot and said peripheral outer edge, said lip being shaped and dimensioned to removably interlock with said lip of said adaptor, and
    (ii) a filter mounted in said filter member housing, said filter member being attached to said adaptor by grasping said peripheral edge with the fingers of a hand, compressing the intermediate portion of said housing with the fingers, moving said filter member lip into said adaptor in said direction of travel of light into said lens, and relaxing said fingers to release the compression on said intermediate portion of said housing to permit said intermediate portion and said first lip to outwardly resiliently expand such that said first lip interlocks with said adaptor lip.

2. The light filtering system of claim 1 wherein said filter member includes a second lip connected to said front surface.

3. The light filtering system of claim 2 wherein said filtering system includes a second filter member removably attached to said first filter member, said second filter member including
  (a) a hollow housing having
    (i) a front surface,
    (ii) a rear surface,
    (iii) an outer peripheral edge circumscribing said housing of said second filter member,
    (iv) at least one slot formed through said housing of said second filter member and extending from said rear surface to said front surface of said second filter member and spaced away from said peripheral edge of said second filter member, the portion of said housing of said second filter member intermediate said slot and said peripheral edge of said second filter member being resiliently inwardly deflected when a compressive force is applied to said portion of said peripheral edge generally centered over said slot of said second filter member,
    (v) a lip attached to and extending outwardly from said back surface of said portion of said housing of said second filter member intermediate said slot and said peripheral outer edge of said second filter member, said lip of said second filter member being shaped and dimensioned to removably interlock with said second lip of said first filter member;
  (b) a filter mounted in said second filter member housing, said second filter member being attached to said first filter member by grasping said peripheral edge of said second filter member with the fingers of a hand, compressing said intermediate portion of said housing of said second filter member, moving said lip of said second filter member into said first filter member in said direction of travel of light into said lens, and relaxing said fingers to release the compression on said intermediate portion of said housing of said second filter member to permit said intermediate portion and lip of said second filter member to outwardly resiliently expand such that said lip of said second filter member interlocks with said second lip of said first filter member.

* * * * *